US012795316B2

(12) United States Patent
Messingher Lang et al.

(10) Patent No.: US 12,795,316 B2
(45) Date of Patent: Nov. 10, 2026

(54) LOCATION BASED AUDIO RENDERING

(71) Applicant: Apple Inc., Cupertino, CA (US)

(72) Inventors: Shai Messingher Lang, Santa Clara, CA (US); Symeon Delikaris Manias, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 18/438,312

(22) Filed: Feb. 9, 2024

(65) Prior Publication Data

US 2024/0284137 A1 Aug. 22, 2024

Related U.S. Application Data

(60) Provisional application No. 63/485,443, filed on Feb. 16, 2023.

(51) Int. Cl.
*H04S 7/00* (2006.01)

(52) U.S. Cl.
CPC .............. *H04S 7/303* (2013.01); *H04S 7/305* (2013.01)

(58) Field of Classification Search
None
See application file for complete search history.

(56) References Cited

U.S. PATENT DOCUMENTS

2008/0069367 A1* 3/2008 Gerrard ...................... H04S 3/00 381/64
2015/0223002 A1* 8/2015 Mehta ........................ H04S 7/30 381/303
2017/0142498 A1* 5/2017 Blong .............. H04N 21/41407
2019/0333488 A1* 10/2019 Wakayama ............. A63F 13/54
2020/0174738 A1* 6/2020 Pratt ...................... G06T 19/006

OTHER PUBLICATIONS

Echoes, "Sound mapping X Spacial audio experts", received from https://echoes.xyz/, Mar. 3, 2020, 9 pages.
Echoes, "ECHOES interactive sound walks", 2021, (Version 5.2.23) [mobile app]. App Store. https://apps.apple.com/us/app/echoes-interactive-sound-walks/id1021511722, 3 pages.
Echoes, "Echoes Labs", recieved from https://echoes.xyz/echoes-labs#case-studies, Mar. 11, 2020, 20 pages.

* cited by examiner

*Primary Examiner* — Antim G Shah
(74) *Attorney, Agent, or Firm* — Aikin & Gallant, LLP

(57) ABSTRACT

A method may include determining a location of a user, determining a virtual playback format based on the location of the user, where the virtual playback format includes a position of a virtual speaker that is fixed in an environment of the user, and determining an acoustic model based on the location of the user. The method also includes rendering audio at the playback device based on the acoustic model and the virtual playback format.

17 Claims, 6 Drawing Sheets

LOCATION BASED AUDIO RENDERING

RELATED APPLICATION

This application claims the benefit of priority of U.S. Provisional Application No. 63/485,443 filed Feb. 16, 2023, which is herein incorporated by reference.

FIELD

One aspect of the disclosure relates to audio processing, in particular, to spatial presentation of audio based on a location of a user.

BACKGROUND

Sound, or acoustic energy, may propagate as an acoustic wave (e.g., vibrations) through a transmission medium such as a gas, liquid or solid. A microphone may sense acoustic energy in the environment. Each microphone may include a transducer that converts vibrations in the transmission medium into an electronic signal which may be analog or digital. The electronic signal, which may be referred to as a microphone signal, characterizes and captures sound that is present in the environment.

Audio (e.g., music, a soundtrack, etc.) may include a recording of a sound field which includes one or more microphone signals over a length of time. Audio may also be generated electronically (e.g., without microphone capture) by synthesizing one or more sounds to build an audio signal. An audio work may be associated with visual objects such as graphics, video, a computer application, or other visual objects.

A processing device, such as a computer, a smart phone, a tablet computer, or a wearable device, can run an application that plays audio to a user. For example, a computer can launch an application such as a movie player, a music player, a conferencing application, a phone call, an alarm, a game, a user interface, a web browser, or other application. The application may cause the audio to output to a user with spatial properties.

SUMMARY

Technology is providing increasingly immersive experiences for a user. Such an immersive experience may include immersion of visual and audio senses such as spatialized audio and/or 3D visual components. Visually displayed objects may be associated with and presented simultaneous with sound. The sound may be presented through surround sound loudspeakers (e.g., 5.1, 6.1, 7.1, etc.). In an immersive experience, however, a user or system may have increased control as to how an object is visually presented (e.g., where the visual object is to be located or how large the visual object is to be presented). As such, it may be beneficial to present audio in a manner that co-exists with visual objects in an immersive environment and provides audio feedback cues to the user that may relate to the visual state of the visual object.

Further, a variety of audio formats exist, such as 5.1, 6.1, 7.1, stereo, object-based audio, or other audio format. An audio format may define location and/or orientation of a speaker relative to a listener or another speaker. It may be beneficial to dynamically select an audio format as well as other audio features, according to user's physical location.

In one aspect, a processing device (e.g., a playback device) may be configured to determine a location of a user, determine a virtual playback format based on the location of the user, where the virtual playback format includes a position of a virtual speaker that is fixed in an environment of the user, and determine an acoustic model based on the location of the user. The processing device may render audio at the playback device based on the acoustic model and the virtual playback format.

In one aspect, a processing device (e.g., a computer server) may obtain a location of a user. The processing device may provide to a playback device, a virtual playback format based on the location of the user, where the virtual playback format includes a position of a virtual speaker that is fixed in an environment of the user. The processing device may provide to the playback device, at least a portion of an acoustic model determined based on the location of the user, where the playback device is to render audio according to the acoustic model and the virtual playback format.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
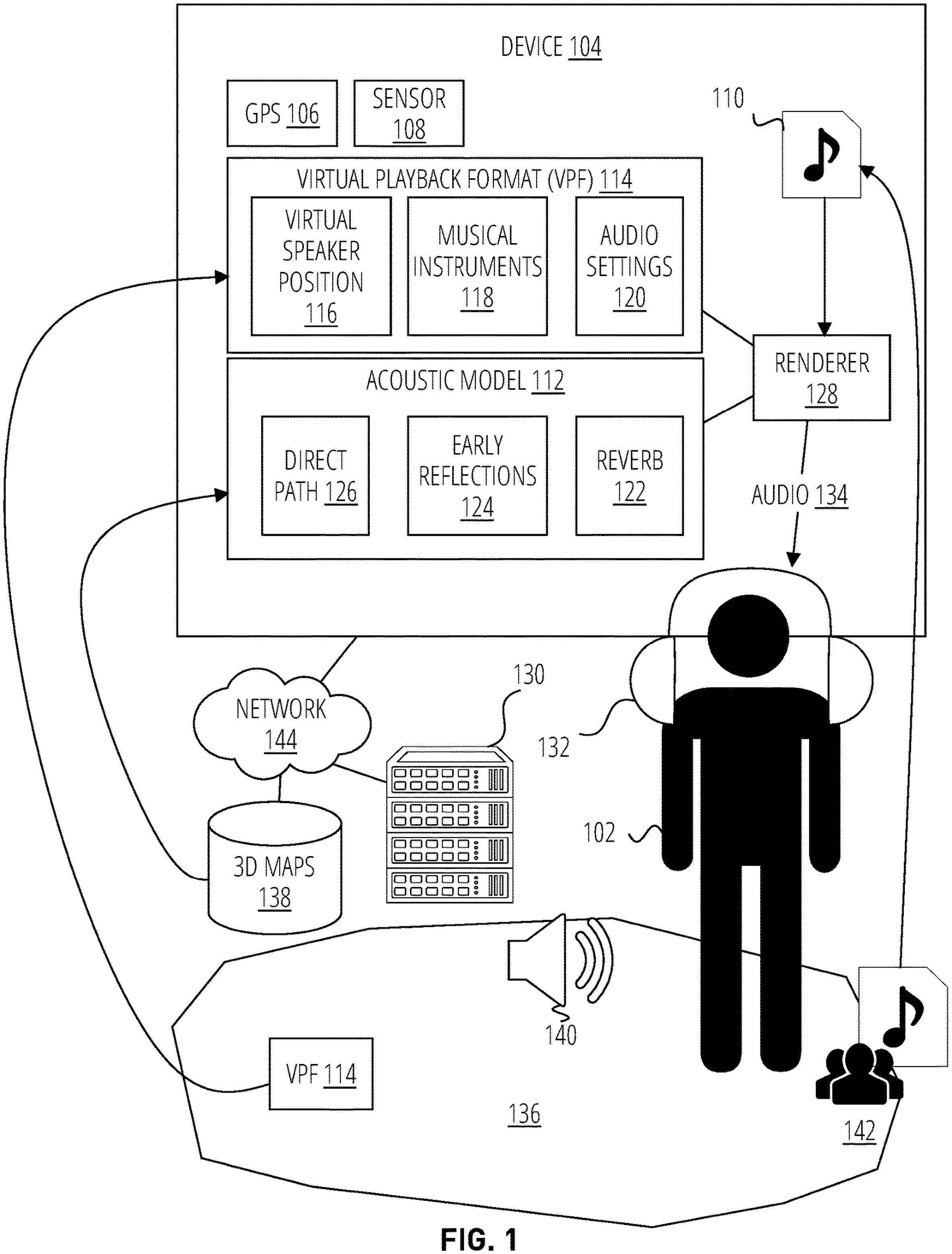
FIG. 1 shows an example of an audio processing device, in accordance with some aspects of the present disclosure.

Humans can estimate the location of a sound by analyzing the sound at their two cars. The human auditory system can estimate directions of sound by sensing the way sound diffracts around and reflects off of our bodies and interacts with our pinna to spectrally shape the sound. Sound from different directions are shaped differently from the human anatomy, and the human nervous system picks up on these differences naturally to identify which direction the sound is coming from. This is known as binaural hearing. Further, other cues such as reverberation and direct-to-reverberation ratio (DRR) may indicate spatial qualities such as how far a sound is from the user, or how large the user's space is.

These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio, which may be referred to as binaural audio, can be produced by a spatial audio reproduction system (a renderer) and output through headphones. Spatial audio can be rendered for playback, so that the audio is perceived to have spatial qualities. For example, spatial audio may reproduce qualities of an original sound scene, such as a talker in front of the capture device, and a bird above the capture device. In other examples, spatial audio may reproduce a fictional sound scene, with spatial qualities authored by an audio content creator. An audio content creator may specify spatial information such as a direction, distance, or position associated with a sound source in the fictional sound scene, and a renderer may render a sound source according to the spatial information. An audio content creator may specify where a virtual speaker is to be fixed in a given environment, or provide an algorithm to automatically place a virtual speaker in the user's location.

The spatial audio may correspond to visual components that together form an audiovisual work. An audiovisual work may be associated with an application, a user interface, a movie, a live show, a sporting event, a game, a conferencing call, or other audiovisual experience. In some examples, the audiovisual work may be integral to an extended reality (XR) environment.

Spatial audio reproduction may include spatializing sound sources or virtual speakers in a scene. The scene may be a three-dimensional representation which may include position of each sound source. In an immersive environment, a user may be able to move around the virtual environment and interact in the scene.

Portable devices may output audio to a user. The user may carry a portable device to various destinations. Typically, a portable device will play the audio without regard to where the user is located. This leaves spatial rendering to feel less realistic as sounds may not be rendered to account for acoustic traits in the user's environment. Further, acoustic modeling of a user's environment can be computationally heavy. Thus, there may be a need to manage real-time modeling (e.g., during playback) to efficiently provide spatial audio that resembles the user's environment while reducing computation. Further, some spaces may include multiple users that may wish to have a shared experience. It may be beneficial for multiple users to have a similar experience and provide some interaction between the users based on location.

In some aspects, a virtual playback format and acoustic model may be associated with a user's location. The virtual playback format may specify location of a virtual speaker in the user's environment. The acoustic model may model the acoustic response of the user's space. The virtual playback format and acoustic model may be used by a playback device during playback. A portion of the acoustic model (e.g., a reverberation model) may be pre-computed and accessed on-demand. Another portion of the acoustic model (e.g., early reflections model) may be determined in real-time based on an acoustic mesh. The compute time for location-based audio rendering may be reduced by obtaining pre-computed reverberation model rather than computing it or updating it during playback of audio.

In some aspects, audio may be crowd-sourced by users in a shared geolocation. Users in a shared location may vote on the audio (e.g., music) that is played at that location. A user in that location may choose to listen to the crowd-sourced audio that has been voted on or to their own playlist. Similar to how speakers are placed in a theme park for users to share a common audio experience, listeners walking down a crowded street may also share a common virtual audio experience with virtual speakers fixed in the environment of the street-goers. Virtual speakers may be arranged in an environment based on location, and virtually rendered to users in the shared environment so that each of the listeners have a common experience. Location-based audio can spatialize audio using known physical environment properties to blend the audio experience with the user's physical experience.

For example, a user may walk on a street and hear spatial audio playback that "belongs" to that space. The user's portable device may include global positioning system (GPS) or other positioning technology that determines a location of a user. With this location, the portable device may pull information (e.g., from a remote device) describing local musical instruments or music (e.g., crowd-sourced audio) that is associated with the user's location. Local music or separate instruments may be used as source material to be augmented or virtualized in an extended reality experience. One or more sounds sources can be arbitrarily positioned in the user's environment using headphones or built-in speakers with virtual surround. A radiation pattern of each sound source may be applied for realistic rendering.

Three-dimensional map data may be stored for a number of different locations. The map data may include detailed three-dimensional data (e.g., grids that defines geometry of objects and structures at the location) for each location that may be annotated with surface material information. From that map data information, a simplified acoustic mesh may be generated and maintained for each location. The simplified acoustic mesh may be a geometrical representation of how sound interacts with a space. One or more simulations may be performed with the acoustic mesh to determine the acoustic model of a given location. A simulation may be performed using a location of a sound source relative to the position of the user and relative to the user's environment (as modeled by the acoustic mesh). Speaker locations may be determined, anchored in a given location and stored with each location and/or the three-dimensional map data.

In some examples, a 3D map library may include a plurality of pre-computed acoustic meshes for each location. An acoustic mesh may be obtained from the 3D map library using the user's location. The 3D map library may include acoustic data that defines acoustic characteristics of the user's environment. The acoustics mesh and/or acoustic characteristics may be applied in rendering of the audio, to tailor the user's acoustic experience to the user's location. The acoustics mesh may include 3D wire mesh model of the environment of the user that is associated with the user's location. In some examples, a reverberation model of different areas that are defined by the 3D map library can be pre-populated by running acoustic simulations on the entirety of acoustics mesh and acoustic data. Thus, the 3D map library may contain a reverberation model for each location in the 3D map library, which may be obtained by the device and used throughout the time the device is in the location. The direct path model and early reflections model may be determined at a higher rate than the reverberation model. Additionally, the direct path model may be computed at the highest rate (e.g., higher than the early reflections model and the reverberation model.

GPS location of a device typically has a slow update rate. In some aspects, a GPS location update may be used to trigger an update to an early reflections model. Additionally, or alternatively, the direct path model may be updated as a function of head orientation of a user. In some aspects, the reverberation model may be obtained by a playback device based on user location and is not updated after that unless the user's geolocation changes (e.g., beyond a threshold). The early reflections model and the direct model may be computed by the playback device.

FIG. 1 shows an audio processing device 104 in accordance with some aspects of the present disclosure. Audio processing device 104 may include processing logic that is configured to perform operations and methods described in the present disclosure. Processing logic, which may also be referred to as a processing device, may comprise hardware (e.g., circuitry, dedicated logic, programmable logic, a processor, a central processing unit (CPU), a system-on-chip (SoC), machine-readable memory, etc.), software (e.g., machine-readable instructions stored or executed by processing logic), or a combination thereof. As such, the audio processing device 104 may be said to be configured to perform one or more operations described. Audio processing device 104 may correspond to an audio processing system 600 as described in other sections.

In one aspect, device 104 may be referred to as a playback device. Device 104 may determine a location 136 of a user 102. The device 104 may determine a virtual playback format 114 based on the location 136 of the user. The virtual playback format 114 may include a virtual speaker position 116 of a virtual speaker 140 that is fixed in an environment of the user. The device 104 may determine an acoustic model 112 based on the location of the user. The device 104 may render audio 110 at the playback device 104 (e.g., at rendering block 128) according to the acoustic model 112 and the virtual playback format 114.

At rendering block 128, the device 104 may apply the acoustic model 112 and the virtual playback format 114 to audio 110. For example, depending on the number of virtual speaker positions, device 104 may generate one or more spatial filters to create the impression of a sound source that corresponds to each virtual speaker specified in the virtual playback format 114. The spatial filters may include gains and/or delays for different frequency bands in terms of the direct path model 126, the early reflections model 124, and reverberation model 122 and spatial audio cues corresponding to a direction of the virtual speaker position 116 relative to the user's position. The direct path model 126 may include a transfer function characterizing the acoustic response of sound from the sound source and the user. The early reflections model 124 may include a transfer function that characterizes the acoustic response of early reflections of sound from the sound source to the user. The reverberation model 122 may include a transfer function that characterizes the acoustic response of late reflections of sound from the sound source to the user. Reverberation model 122 may also be referred to as a late reverberation model. The acoustic model 112 may be applied to audio 110 through convolution and summation.

The resulting audio channels 134 may be used to drive speakers 132 which may be head-worn speakers. Audio channels 134 may include a left audio channel and a right audio channel that are each spatialized (e.g., containing spatial cues) to form binaural audio. Speakers 132 may include a left speaker and a right speaker that are each worn near, on, in, or over an car of the listener 102. Device 104 may include multiple devices such as a mobile device (e.g., a smart phone, a tablet computer, a laptop, etc.) and headphones. In other examples, device 104 may include a head mounted display with built in speakers 132. Device 104 may also include other combinations of devices.

The device 104 may include GPS 106 or one or more sensors 108 to determine a location 136 of the user. Further, the device 104 may use the one or more sensors 108 to determine the position of the user 102. For example, sensor 108 may include an accelerometer, an inertial measurement unit (IMU), a gyroscope, a camera, or any combination thereof. The device may apply an algorithm to sensor data to determine a position (e.g., a head direction and/or head position) of the user 102. For example, the device may apply a simultaneous localization and mapping (SLAM) algorithm to camera images to determine the position (e.g., a head position) of user 102. This device may apply a position tracking algorithm to an accelerometer or gyroscope signal to determine the head position of user 102. The user's position may indicate a location of the head and/or the direction of the user's head, in three-dimensional space. The device may track the position of user 102 relative to the location 136 and adjust the rendering of virtual speakers to dynamically compensate for the changes in the user's position, so that the virtual speaker 140 appears to remain fixed in the user's environment. For example, if the virtual speaker is fixed at landmark, as the user walks away from the landmark or turns her head, the virtual speaker is still rendered as being fixed to the landmark.

The virtual playback format 114 may include one or more virtual speaker positions 116 that define where each of one or more speakers is to be fixed in the user's environment. The environment may be understood as the physical space around the user at the user's location 136. For example, the user's environment may include objects such as buildings, statues, cliffs, the ground, walls, or other geographically fixed objects. The user's location 136 may include a geolocation of the user 102, such as a latitude and longitude or other suitable coordinate that identifies the physical location of the user. The user's location may indicate a neighborhood, a venue, a building, a city, a park, or other indication of where the user 102 is located. Each virtual speaker position 116 may define where a corresponding virtual speaker is to be fixed in the user's environment.

The virtual playback format 114 may be obtained in response to the user's location being detected as location 136. As such, the one or more virtual speaker positions 116 or other information such as musical instruments 118 and other audio settings 120 may be obtained that are specific to that location 136. For example, virtual playback format 114 may indicate that virtual speaker 140 is to be fixed on a wall or landmark in the user's physical environment at location 136. Device 104 may render audio 110 based on the virtual playback format 114 to provide a tailored audio experience that is specific to that location 136.

The virtual playback format 114 may include a musical instrument type 118 and/or audio settings 120. As with the virtual speaker position 116, the musical instrument type 118 may also be specific to user location. For example, location 136 may be known for a musical instrument type (e.g., a harp). The virtual playback format 114 may store harp as the musical instrument 118 which is then used by the playback device 104 to render audio 110 as a harp sound.

Further, location 136 may have audio settings 120 such as playback volume or other audio settings. For example, location 136 may be a tranquil outdoor setting (e.g., a lake). As such, the playback volume may be a low setting. In contrast, if location 136 is a busy city street, the playback volume may be a high setting (e.g., higher than the low setting).

In some examples, an acoustics mesh may be obtained from a 3D map library 138 using the user's location. The 3D map library may include acoustic data that defines acoustic characteristics of the user's environment. The acoustics mesh and/or acoustic characteristics may be applied in rendering of the audio, to further tailor the user's acoustic experience to the user's location. In some examples, a portion of the acoustic model 112 (e.g., reverberation model 122) may be obtained from over the network 144. This portion may include a pre-computed reverberation model that is specific to location 136, calculated off-line in batches by running acoustic simulations on the entirety of acoustics mesh and acoustic data in the 3D maps. In some aspects, a server 130 may perform such batch operations.

In some aspects, server 130 may be configured to perform operations that tailor audio playback based on user location. For example, server 130 may be communicatively coupled to a playback device such as device 104 or a different playback device. Server 130 may obtain a location 136 of the user 102. For example, device 104 may use GPS 106 to perform localization and communicate this location (e.g., coordinates) to server 130. Server 130 may provide to the playback device 104, a virtual playback format (such as virtual playback format 114) based on the location 136 of the user 102. This may be determined based on information from 3D map library 138, as described in other sections. The virtual playback format may include a position of a virtual speaker that is fixed relative to the location 136 of the user. The server 130 may provide, to the playback device, at least a portion of an acoustic model 112 (e.g., a complete reverberation model 112) determined based on the location 136 of the user. The playback device is to render audio according to the acoustic model and the virtual playback format.

In some aspects, audio 110 may include a crowd-sourced audio 142 that is determined based on input obtained from one or more other users that are associated with the same location 136 of the user. Server 130 may provide the crowd-sourced audio 142 to the playback device 104 based on the location 136 of the user 102. For example, one or more users (which may include user 102) that are at location 136 may vote to decide what the crowd-sourced audio asset 142 will be. The crowd-sourced audio 142 may include a single audio asset (e.g., a song), a list of audio assets (e.g., a playlist), or a genre of audio asset (e.g., 'jazz', 'rock', 'orchestral', etc.). The audio asset which receives the most votes may be stored as a crowd-sourced audio asset 142 that is associated with location 136. Device 104 may provide user 102 with an option to vote on, or an option to play the crowd-sourced audio, in response to detecting that the user is in location 136. Users outside of location 136 may not have access to the crowd-sourced option of location 136. The user 102 may select the crowd-sourced audio as audio 110, or select a different audio (e.g., music on the user's personal playlist) as audio 110. The crowd-sourced audio 142 for a given location may change over time. For example, a user may vote (with device 104) on a new audio asset to become crowd-sourced audio 142. If enough other users at location 136 agree, then the new audio asset may become the crowd-sourced audio 142. In some examples, the election of crowd-sourced audio may be managed through communications between device 104 and other devices, or between a device 104 and server 130. In some examples, the crowd-sourced audio may be selected without explicit selection (e.g., most played song, list, genre, etc. by users in location 136).

Although FIG. 1 shows a single location, it should be understood that aspects of the disclosure applies to multiple locations. Different locations may be rendered according to the virtual playback format and acoustic model that is specific to the respective location. Different locations may be associated with different acoustic models and different virtual playback formats, as shown in FIG. 2.

Figure 2:
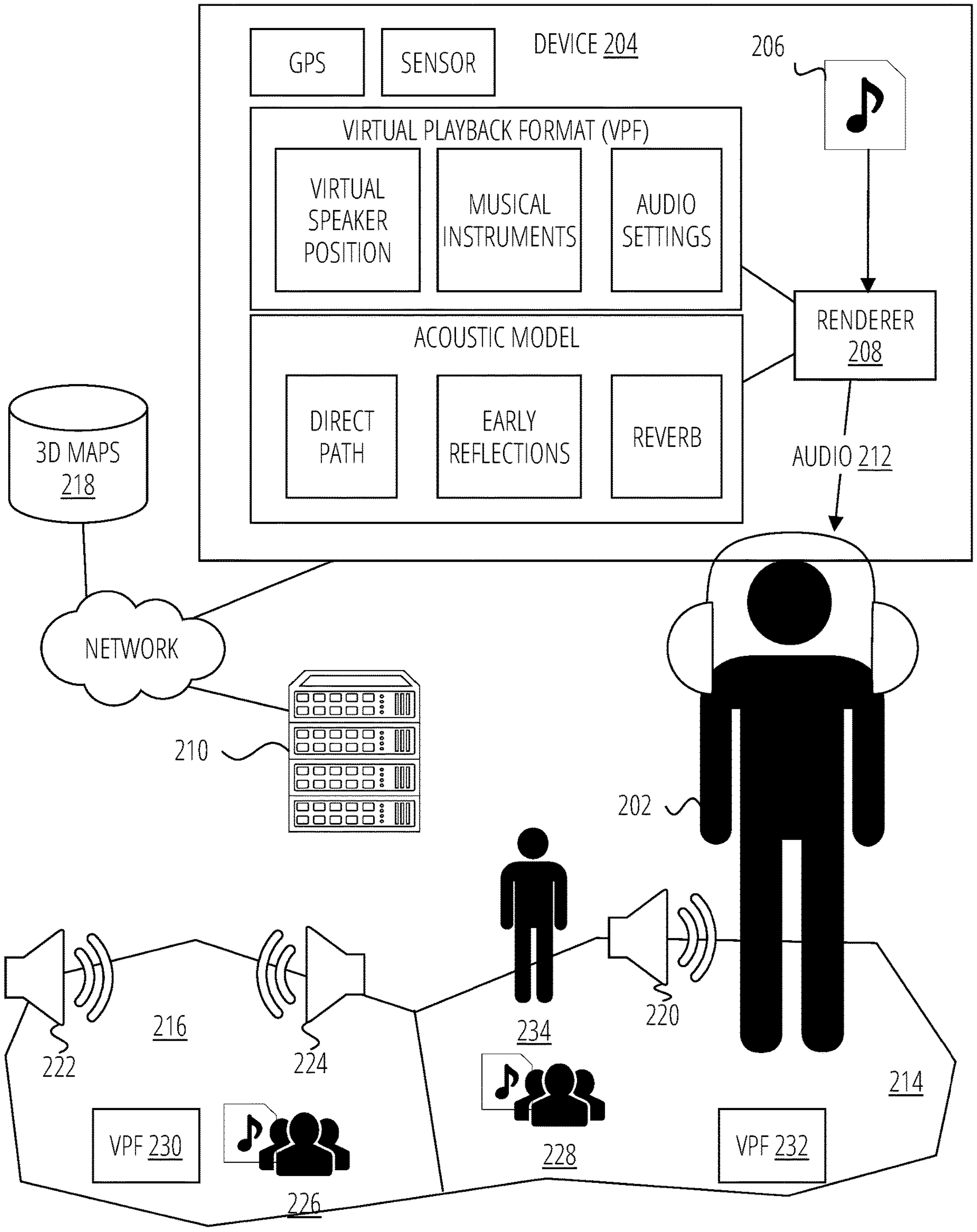
FIG. 2 shows an example of an audio processing device in the context of different locations, in accordance with some aspects.

FIG. 2 shows an audio processing device 204 with respect to multiple locations, in accordance with some aspects. Although shown in the context of multiple locations, it should be understood that audio processing device 204 may correspond to audio processing device 104 as described in FIG. 1.

As described, audio processing device 204 may determine a location (e.g., location 214 or location 216) of a user 202. The device 204 may determine a virtual playback format based on the location of the user. The virtual playback format may include one or more virtual speaker positions of a virtual speaker that is fixed in an environment of the user. The device 204 may determine an acoustic model based on the location of the user. The device 204 may render audio 206 at the playback device according to the acoustic model and the virtual playback format. The resulting audio channels 212 may be used to drive speakers which may be head-worn speakers.

The virtual playback format and the acoustic model used to render the audio at block 208 may depend on which location the user is in. For example, the virtual playback format 232 that is associated with location 214 may be applied to render a virtual speaker 220 that is fixed to a first position in an environment of the user, with the acoustic model determined based on location 214. Responsive to sensing a change in surroundings of the user (e.g., to location 216), device 204 may apply a second virtual playback format 230 that is associated with location 216. Renderer 208 may render audio 206 to output sound from virtual speakers 222 and virtual speakers 224 at fixed positions in the environment of the user at location 216 with the acoustic model determined based on location 216.

To determine the acoustic model, the device 204 may obtain acoustic information from 3D map library 218 that is associated with the current location of the user. For example, device 204 may obtain acoustic information (e.g., acoustic mesh and a reverberation model) that is associated with location 214 in response to detecting that the user 202 is within location 214. Device 204 may determine the acoustic model based on the acoustic information (e.g., a complete reverberation model and/or an acoustic mesh), and render audio 206 at block 208 based on the acoustic model. The acoustic model may include a transfer function that acoustically models the direct path between a sound source (e.g., a virtual speaker) and the user, early reflections of the sound source and the user, and reverberation of the sound source and the user. The difference in environment of the user may directly influence how the sound is experienced by the user, hence, different environments may have different models. The resulting audio 212 once rendered with the acoustic model, may have acoustic qualities that resemble or are the same as the acoustic qualities created by the physical environment at location 214. However, when user 202 moves to location 216, a different reverberation model and/or a different acoustic mesh may be obtained from the network, corresponding to location 216. The resulting output audio 212 may reflect the change to the user's location. As such, the audio 212 may contain acoustic cues that resemble or are the same as the environment of the user. Some of the acoustic model (e.g., the direct path model and early reflections model) may be determined and updated in real-time (e.g., during playback) by the playback device 204. As such, changes in the user's position relative to the virtual speaker (e.g., 220) may be accounted for during playback. The reverberation model may be determined at a prior time (e.g., by a remote device such as server 210). The playback device may use the same reverberation model (e.g., without updates) while the user is in location 214, regardless of changes to the user's position.

As described, each location may have a crowd-sourced audio selection that is specific to that location. The crowd-sourced audio may be provided to the playback device 204 based on the location of the user. For example, crowd-sourced audio 228 may be determined from input (e.g., a voting process) obtained from voters that are in location 214. Device 204 may provide the user with an option to select the crowd-sourced audio 228. Further, device 204 may provide the user with an option to vote on the crowd-sourced audio 228. Device 204 may include a user interface (e.g., a graphical user interface (GUI) or other user interface) that takes user input such as audio selection or voting. Responsive to detecting that the device 204 has changed to a different location (e.g., location 216), device 204 may present a different crowd-sourced audio (e.g., 226) to the user 202. At location 216, user 202 may provide input to change or vote on crowd-sourced audio 226.

The virtual playback format may include one or more virtual speaker positions that define where each of one or more speakers is to be fixed in the user's environment. The environment may be understood as the physical space around the user at the user's location. Server 210 may provide the same virtual playback format and acoustic modeling information to users in the same location. For example, server 210 may provide user 234 and user 202 with the same virtual playback format 232 and the same acoustic information (e.g., reverberation model and acoustic mesh). The playback device of user 234 and user 202 may render audio with the same virtual speaker position and the same acoustic model traits.

For example, virtual playback format may be obtained as virtual playback format 232 which is associated with location 214. Virtual playback format 232 may indicate that virtual speaker 220 is to be fixed on a structure in the user's physical environment at location 214. Both users, regardless of their position in the environment, may experience speaker 220 to be fixed at the same position on the same structure.

A different location (e.g., location 216) may have a different virtual playback format 230 that defines different virtual speaker positions for virtual speakers 222 and 224. Those virtual speakers may be fixed to different positions in a different environment at location 216. When user 202 moves from location 214 to location 216, device 204 may detect this change in location and then update its virtual playback format by obtaining virtual playback format 230. Device 204 may render audio 206 based on the virtual playback format 230.

Similarly, the musical instruments or other audio settings may be obtained that are associated with location 216. Further, the virtual playback format that is associated with each location may specify a musical instrument type. For example, at location 214, virtual playback format 232 may specify a first musical instrument type (e.g., 'harp'), while at location 216, virtual playback format 230 specifies a second musical instrument type (e.g., 'piano'). By moving from location 214 to location 216, the instrument used to render the same audio may be changed.

The virtual playback format in each location may vary in the number of virtual speakers rendered, or in where the speakers are fixed to, or how far the speakers are from the user. Further, each virtual playback format may include additional information of the virtual speakers such as a polar pattern of the virtual speaker. For example, at the first location 214, the virtual playback format 232 may define a single omni-directional virtual speaker 220 as being fixed on a structure (e.g., a lamp post). At second location 216, the virtual playback format 230 may define two higher directivity virtual speakers 222 and 224, each fixed to corners of a building. The polar pattern of a speaker as defined by the virtual playback format may include a geometry, a speaker directivity, or other convention.

Further, each virtual playback format (e.g., 230 and 232) may include one or more audio settings such as playback loudness or other audio settings. For example, if location 214 is a tranquil outdoor setting (e.g., a lake), the playback loudness may be 'x'. If location 214 is a busy city street, the playback loudness may be greater than 'x'.

Figure 3:
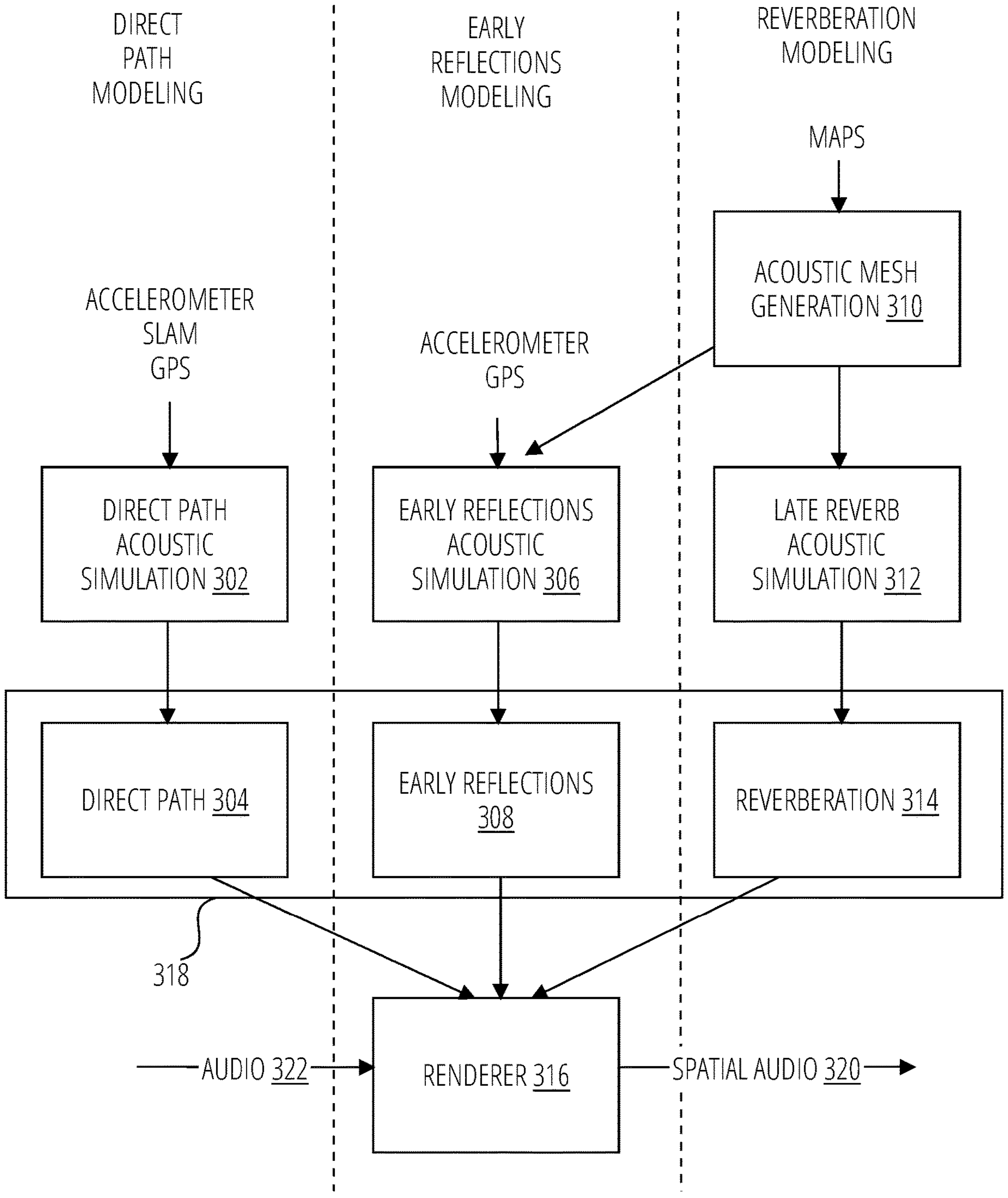
FIG. 3 shows an example workflow for determining an acoustic model, in accordance with some aspects.

FIG. 3 shows an example workflow for determining an acoustic model, in accordance with some embodiments.

As described, the acoustic model may include a direct path model 304, an early reflections model 308, and a reverberation model 314. The direct path model 304 may include one or more transfer functions characterizing the acoustic response of sound from the sound source and the user. The early reflections may include one or more second transfer functions that characterizes the acoustic response of early reflections of sound from the sound source to the user. The reverberation model 314 may include one or more transfer functions that characterizes the acoustic response of late reflections of sound from the sound source to the user.

It should be understood that a transfer function as used in the present disclosure may be interchangeable with an impulse response, depending on if the acoustic response of the system is expressed in the time domain or frequency domain. Early reflections may include reflections of sound energy up to a time threshold (e.g., 50 or 60 ms). Late reflections may include reflections of sound energy after the time threshold.

In some aspects, the reverberation model 314 is predetermined based on an acoustic simulation and a three-dimensional map (e.g., an acoustic mesh) that is associated with the location of the user. For example, at block 310, an acoustic mesh may be generated for each of a plurality of locations based on 3D map data. The acoustics mesh may be generated as a simplified version of a 3D model of an environment. The acoustics mesh may include geometry and size of objects and surfaces in the environment. The 3D map data may be generated based on a patchwork of images that can be taken from satellite and/or mobile camera stations.

Block 308 may be performed offline by a remote computing device (e.g., a server). At block 312, the remote computing device may perform an acoustic simulation with each acoustic mesh to determine a corresponding reverberation model 314 on a per-location basis. Surface properties may be included in the acoustic mesh, to quantify how much sound energy is absorbed after a reflection off a surface. The reverberation model 314 may be made available by the remote computing device (e.g., over a network) so that a playback device may obtain the reverberation model 314 that corresponds to the user's current location. The playback device may thus obtain the reverberation model 314 associated with the user's location, without performing the simulation to determine the reverberation model locally. This may reduce the overhead of the playback device, considering that the reverberation of the user's environment remains reasonably constant throughout the user's location.

At block 306, the early reflections model 308 may be determined based on a location of the playback device and a sensed position of the user. As described, the user's position may include a head position, which may be determined based on an accelerometer, IMU, camera, or gyroscope worn on the user's head. The playback device may apply a localization algorithm such as SLAM and/or other algorithm to determine the user's position. The user's position may include the direction and location of the user in the user's environment. The location may be determined based on GPS of the user's local device. The playback device may obtain the acoustic mesh that corresponds to the user's current location and perform a simulation to model early reflections from a sound source to the user's position, with the environment (e.g., surrounding surfaces) modeled from the acoustic mesh. Surface properties may be included in the acoustic mesh, to quantify how much sound energy is absorbed after a reflection off a surface. The simulation may yield the early reflections model 308 that is specific to the user's position (e.g., the user's head position) and the sound source location (as specified by the speaker position) in the simulated environment of the user.

In some examples, determining the early reflections model 308 may include updating the early reflections model responsive to an update to the GPS location of the playback device. For example, GPS location of the playback device may update at a rate of 'x' Hz. The simulation at block 306 may be repeated in response to each update, and recalculating the early reflections model 308 at that rate. The renderer 208 may use the most up-to-date model.

A direct path model 304 may be determined based on a simulation with the position of the user and the position of the sound source. The direct path model 304 may be determined or updated at a rate that corresponds to determining the user position. For example, at block 302, a simulation may be performed by the playback device using the user's position which is determined from a sensor such as an accelerometer, inertial measurement unit (IMU), gyroscope, SLAM, or GPS. The direct path model may be updated responsive to updates in the position of the user as determined by the sensor or responsive to an update rate of a given sensor. The direct path simulation may not include an acoustic mesh. Rather, the direct path simulation may model the response of the sound as it travels directly from the sound source (e.g., a virtual speaker) to the user. The simulation at block 302 may be repeated in response to detecting a movement of the user.

The acoustic model 318 may represent a head related transfer function with spatial qualities of the environment of the user as modeled in the direct path model 304, the early reflections model 308, and the reverberation model 314. At block 316, the model may be applied to audio 322 to produce spatial audio with spatial qualities that are specific to the user's environment. Audio 322 may vary in format. For example, audio 322 may include multiple channels for a surround sound speaker layout, or a left and right audio channel for stereo, or a single audio channel for mono, or other arrangement. Block 316 may include performing downmixing or upmixing, depending on how many channels the input audio includes, to upmix or downmix the channels as needed. The upmixed or downmixed audio may be spatialized by applying the acoustic model 318, resulting in spatial audio 320. Spatial audio 320 may include a left audio channel and a right audio channel having binaural spatial audio cues that give the impression of direction, distance, size, or other spatial attributes.

Figure 4:
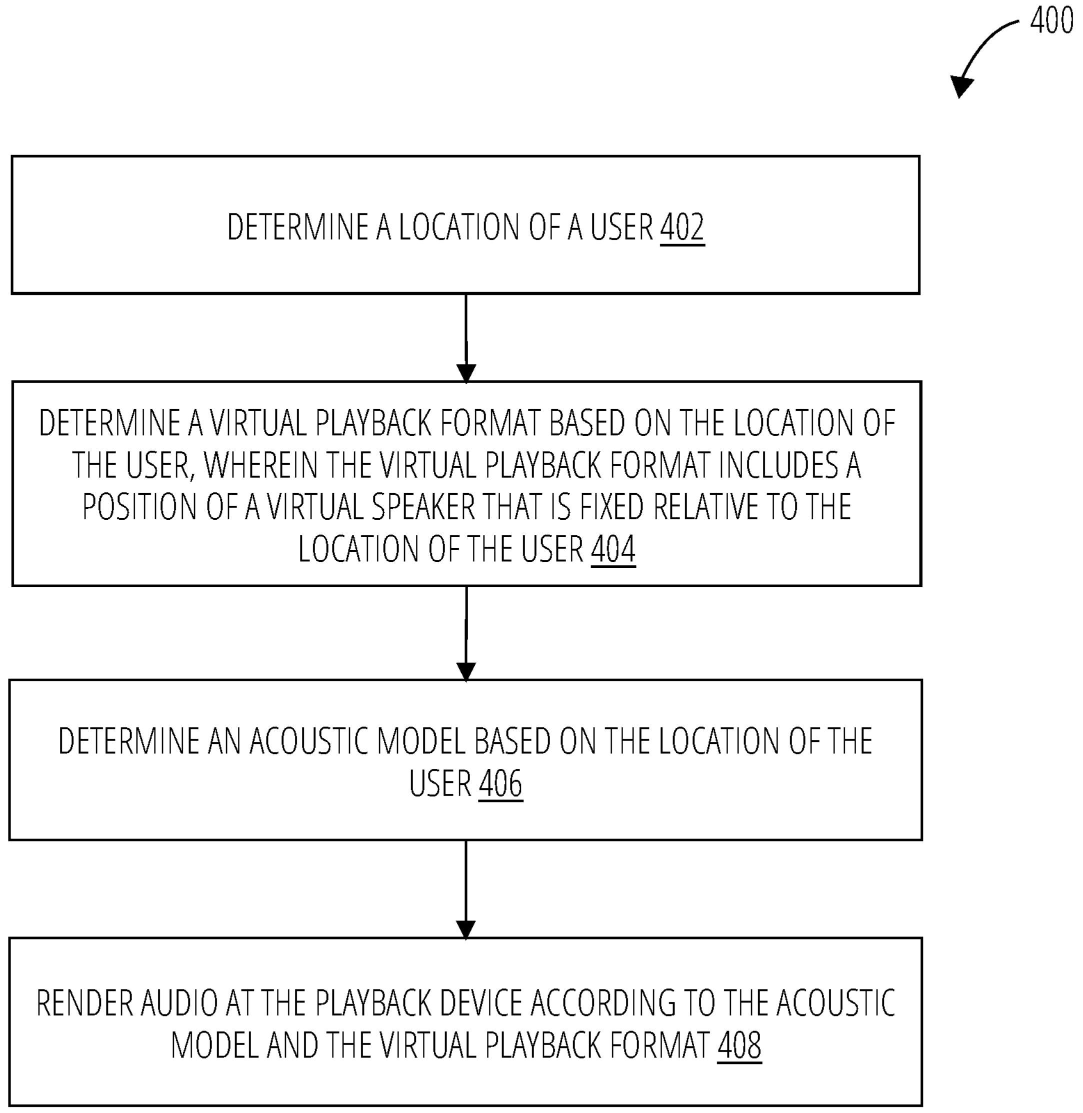
FIG. 4 illustrates an example method of providing an immersive audio experience with virtual speakers, in accordance with some aspects.

FIG. 4 illustrates an example method 400 of providing an immersive audio and visual experience with virtual speakers, in accordance with some aspects. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed. Method 400 may be performed by a playback device which may include a combination of devices (e.g., a mobile handheld device and a head-worn device).

At block 402, processing logic may determine a location of a user. For example, processing logic may determine its location based on GPS or based on a different technology. The location may be defined as borders or an area, such that when detected within the borders or the area, the user is deemed to be at the location. Outside the borders or the area, the user may be determined to no longer be at the location.

At block 404, processing logic may determine a virtual playback format based on the location of the user, wherein the virtual playback format includes a position of a virtual speaker that is fixed in an environment of the user. For example, even as the user moves throughout the environment, or turns to face a different direction, the position of the virtual speaker is rendered to appear to remain stationary in the environment.

At block 406, processing logic may determine an acoustic model based on the location of the user. The acoustic model may model how sound responds in the user's environment. The acoustic model may change based on a changed location of the user. A portion of the acoustic model (e.g., a direct model, or early reflections model, or both) may be determined or updated in real-time (e.g., during playback of the audio) and a second portion (e.g., a reverberation model) may be performed prior to playback and obtained on-demand, for example, in response to entering a location.

At block 408, processing logic my render audio at the playback device based on the acoustic model and the virtual playback format. For example, the virtual playback format may define how many virtual speakers are to be present in the user's environment, and where each of those speakers are to be located. Processing logic may generate spatial filters to spatially render the virtual speakers at those locations, using the direct path model, the early reflections model, and the reverberation model to model how sound travels directly from each virtual speaker to the user, as well as how sound reflects in the user's environment from each virtual speaker to the user.

The virtual playback format may include additional information such as, for example, a musical instrument type, or other audio settings such as, for example, a playback loudness. Processing logic may apply the audio settings to the playback, or render the audio using a digital version that matches the musical instrument type.

Figure 5:
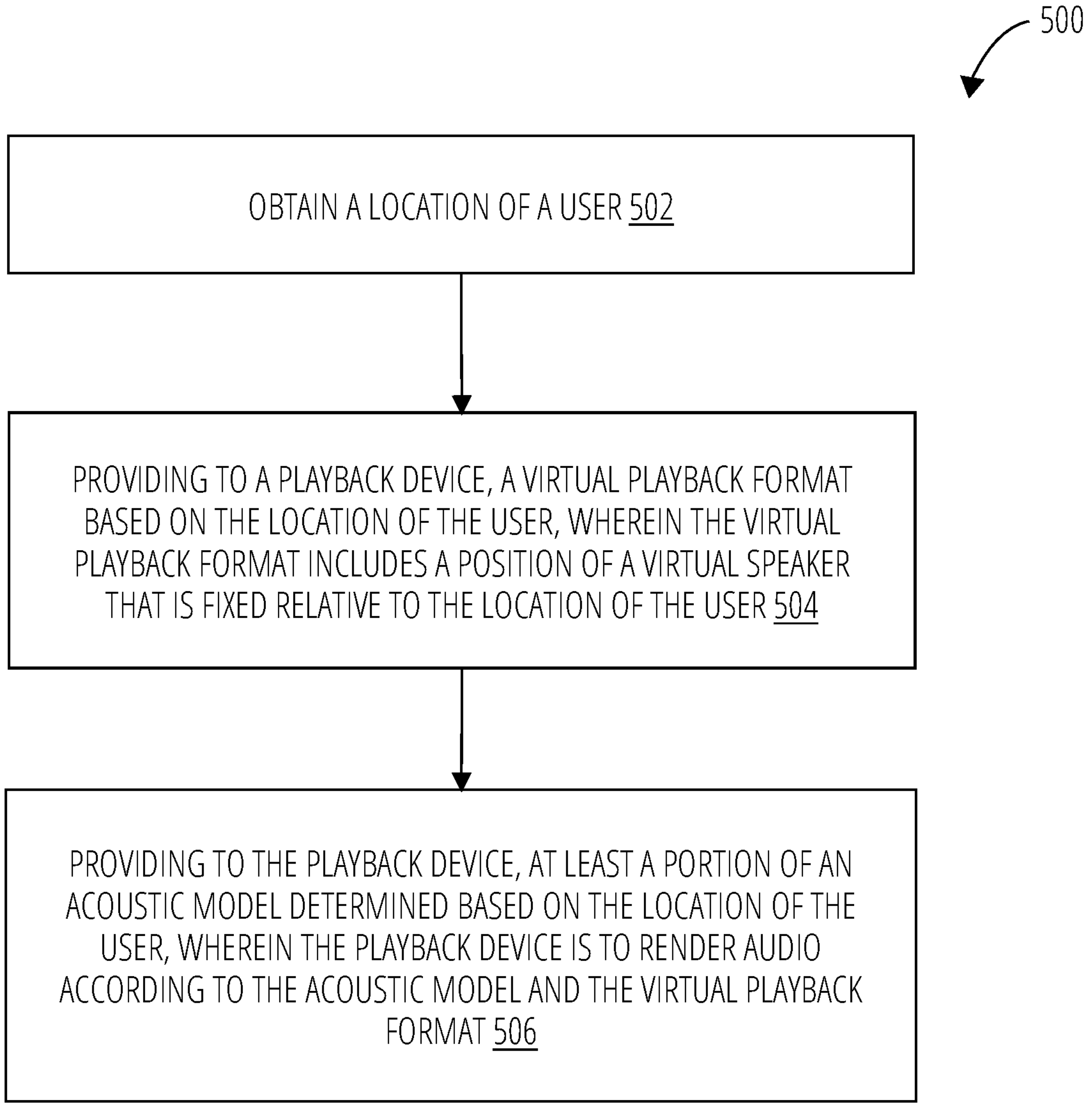
FIG. 5 illustrates an example method for remotely supporting an immersive audio experience with virtual speakers, in accordance with some aspects.

FIG. 5 illustrates an example method 500 of providing an immersive audio and visual experience with virtual speakers, in accordance with some aspects. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed. Method 500 may be performed by a computing device (e.g., a computer server) to provide a playback device with information used by the playback device to render audio as described. The computing device may be a remote computing device that is separate from the playback device.

At block 502, processing logic may obtain a location of a user. For example, processing logic may communicate with a playback device over a computer network to obtain the location of the user. The location may include geolocation coordinates or other localization information.

At block 504, processing logic may provide to the playback device, a virtual playback format based on the location of the user, wherein the virtual playback format includes a position of a virtual speaker that is fixed in an environment of the user. For example, the virtual playback format may provide coordinates (e.g., 3D coordinates) that define where the virtual speaker is to be placed in the environment and location of the user.

At block 506, processing logic may provide to the playback device, at least a portion of an acoustic model determined based on the location of the user, wherein the playback device is to render audio according to the acoustic model and the virtual playback format. For example, processing logic may obtain that user is in location 'Y'. Processing logic may browse a database and pull a predetermined reverberation model that characterizes the reverberation at location 'Y'. Processing logic may communicate the reverberation model to the playback device over the computer network. The playback device may use this portion of the acoustic model, with other portions of the acoustic model (e.g., direct model, early reflections model, or both) to spatially render audio.

In some examples, processing logic may batch process information in a 3D library to pre-determine a reverberation model for each location that is mapped. For example, a 3D library may contain 3D information of different geographical locations that define surfaces and geometries of fixed structures in the respective geographical location. Processing logic may apply an algorithm to various parts of the 3D information to generate acoustic meshes from the 3D information. Each acoustic mesh may be a simplified portion of the 3D map data. Processing logic may perform an acoustic simulation for each acoustic mesh to determine a corresponding reverberation model for a given location. The library of reverberation models may each be associated with a location and provided to a playback device on demand. For example, if a playback device is detected to be at location 'x', processing logic may provide the playback device with the reverberation model that was previously simulated using the 3D map data of location 'x'.

Figure 6:
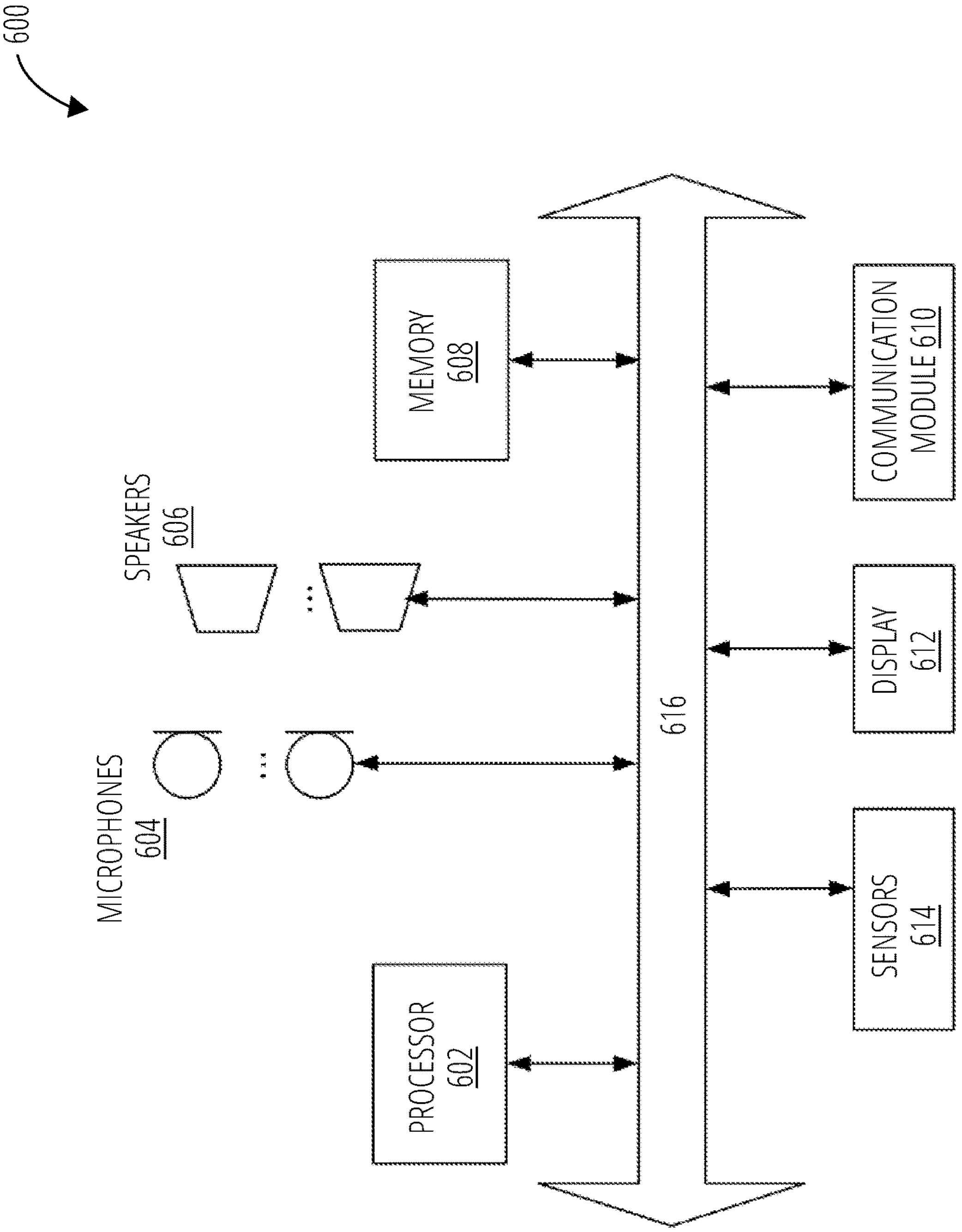
FIG. 6 illustrates an example of an audio processing system, in accordance with some aspects.

FIG. 6 illustrates an example of an audio processing system 600, in accordance with some aspects. In some examples, audio processing system 600 may correspond to an audio processing device, a display, and/or a playback device, as described herein. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The audio processing system 600 can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system can include one or more buses 616 that serve to interconnect the various components of the system. One or more processors 602 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 608 can include Read Only Memory (ROM), volatile memory, and non-volatile memory, or combinations thereof, coupled to the bus using techniques known in the art. Sensors 614 can include an accelerometer, an inertial measurement unit (IMU) and/or one or more cameras (e.g., RGB camera, RGBD camera, depth camera, etc.) or other sensors described herein. The audio processing system can further include a display 612 (e.g., an HMD, or touchscreen display).

Memory 608 can be connected to the bus and can include DRAM, a hard disk drive or a flash memory or a magnetic optical drive or magnetic memory or an optical drive or other types of memory systems that maintain data even after power is removed from the system. In one aspect, the processor 602 retrieves computer program instructions stored in a machine-readable storage medium (memory) and executes those instructions to perform operations described herein.

Audio hardware, although not shown, can be coupled to the one or more buses in order to receive audio signals to be processed and output by speakers 606. Audio hardware can include digital to analog and/or analog to digital converters. Audio hardware can also include audio amplifiers and filters. The audio hardware can also interface with microphones 604 (e.g., microphone arrays) to receive audio signals (whether analog or digital), digitize them when appropriate, and communicate the signals to the bus.

Communication module 610 can communicate with remote devices and networks through a wired or wireless interface. For example, communication module can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms “logic”, “processor”, “manager”, “renderer”, “system”, “device”, “mapper”, “block”, may be representative of hardware and/or software configured to perform one or more processes or functions. For instance, examples of “hardware” include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of “software” includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system’s registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

In some aspects, this disclosure may include the language, for example, “at least one of [element A] and [element B].” This language may refer to one or more of the elements. For example, “at least one of A and B” may refer to “A,” “B,” or “A and B.” Specifically, “at least one of A and B” may refer to “at least one of A and at least one of B,” or “at least of either A or B.” In some aspects, this disclosure may include the language, for example, “[element A], [element B], and/or [element C].” This language may refer to either of the elements or any combination thereof. For instance, “A, B, and/or C” may refer to “A,” “B,” “C,” “A and B,” “A and C,” “B and C,” or “A, B, and C.”

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(*f*) unless the words “means for” or “step for” are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method performed by a processor of a playback device, comprising:

obtaining a location of a user;

receiving audio that is determined based on a plurality of votes from a plurality of devices of a plurality of users that are associated with the location of the user;

obtaining a virtual playback format based on the location of the user, wherein the virtual playback format includes a position of a virtual speaker that is fixed in an environment of the user, wherein the virtual playback format includes a musical instrument type to render the audio in, the musical instrument type being associated with the location of the user;

obtaining an acoustic model based on the location of the user; and rendering the audio at the playback device based on the acoustic model and the virtual playback format.

2. The method of claim 1, wherein the location is a physical location of the user, wherein the plurality of votes are provided while the plurality of users are located within the physical location of the user.

3. The method of claim 1, further comprising, in response to detecting a change in the location of the user, obtaining a second virtual playback format that includes a second position of a second virtual speaker that is fixed in the environment of the user.

4. The method of claim 1, wherein obtaining the acoustic model includes obtaining a reverberation model that is associated with the location of the user and rendering the audio is based at least on the reverberation model.

5. The method of claim 4, wherein the reverberation model is generated remotely based on an acoustic simulation with three-dimensional information that is associated with the location of the user.

6. The method of claim 5, wherein obtaining the acoustic model includes obtaining an early reflections model based on a position of the user and the three-dimensional information that is associated with the location of the user, and rendering the audio is based at least on the early reflections model and the reverberation model.

7. The method of claim 6, wherein obtaining the early reflections model includes updating the early reflections model responsive to a global positioning system (GPS) update of the playback device.

8. The method of claim 1, wherein obtaining the acoustic model includes obtaining a direct path model based on a position of the user and the position of the virtual speaker, and updating the direct path model responsive to an update in the position of the user.

9. The method of claim 8, wherein the position of the user is determined based on at least one of: an accelerometer, an inertial measurement unit (IMU), a simultaneous localization and mapping (SLAM) algorithm, camera images, or global positioning system (GPS).

10. A method performed by a processor of a server, comprising:

obtaining a location of a user;

providing audio to a playback device of the user, wherein the audio is determined based on a plurality of votes obtained from a plurality of devices of a plurality of users that are associated with the location of the user;

providing to the playback device, a virtual playback format based on the location of the user, wherein the virtual playback format includes a position of a virtual speaker that is fixed in an environment of the user, wherein the virtual playback format includes a musical instrument type that is associated with the location of the user to render the audio in; and providing to the playback device, at least a portion of an acoustic model determined based on the location of the user, wherein the playback device is to render the audio according to the acoustic model and the virtual playback format.

11. The method of claim 10, wherein the location is a physical location of the user, wherein the plurality of votes are provided while the plurality of users are located within the physical location of the user.

12. The method of claim 10, further comprising maintaining a plurality of virtual playback formats, wherein each of the plurality of virtual playback formats is associated with a respective location.

13. The method of claim 10, wherein providing at least the portion of the acoustic model includes providing, to the playback device, a reverberation model that is associated with the location of the user based on a GPS location of the playback device.

14. The method of claim 13, further comprising generating the reverberation model based on performing an acoustic simulation with three-dimensional information that is associated with the location of the user, and providing the reverberation model to the playback device based on the location of the user and the playback device.

15. The method of claim 10, wherein the playback device determines a remaining portion of the acoustic model.

16. A non-transitory machine-readable storage medium comprising instructions that when executed by a processing device, cause the processing device to:

determine a location of a user;

receive audio that is determined based on a plurality of votes from a plurality of devices of a plurality of users that are associated with the location of the user;

determine a virtual playback format based on the location of the user, wherein the virtual playback format includes a position of a virtual speaker that is fixed in an environment of the user, wherein the virtual playback format includes a musical instrument type to render the audio in, the musical instrument type being associated with the location of the user;

determine an acoustic model based on the location of the user; and render the audio based on the acoustic model and the virtual playback format.

17. The non-transitory machine-readable storage medium of claim 16, wherein the location is a physical location of the user, wherein the plurality of votes are provided while the plurality of users are located within the physical location of the user.

* * * * *